United States Patent [19]

Cuschera

[11] Patent Number: 4,730,854
[45] Date of Patent: Mar. 15, 1988

[54] SEALABLE DRAIN FITTING

[76] Inventor: Casper Cuschera, 1047 77th Ave., Oakland, Calif. 94621

[21] Appl. No.: 287,549

[22] Filed: Jul. 28, 1981

[51] Int. Cl.[4] .............................................. F16L 41/00
[52] U.S. Cl. ........................................ 285/42; 285/58; 285/915; 4/288
[58] Field of Search ........................ 285/56, 57, 58, 59, 285/60, 42, 383, 15; 4/252 R, 286, 288

[56] References Cited

U.S. PATENT DOCUMENTS

| 865,497 | 9/1907 | Kenyon | 285/383 X |
| 3,015,501 | 1/1962 | Minella | 285/58 |
| 3,411,628 | 11/1968 | Mason | 4/286 X |
| 3,742,525 | 7/1973 | Oropallo | 4/288 |
| 3,896,510 | 7/1975 | O'Connell | 285/56 X |
| 4,095,825 | 6/1978 | Butler | 285/DIG. 16 X |
| 4,164,796 | 8/1979 | Sakow | 4/286 X |

Primary Examiner—Thomas F. Callaghan
Attorney, Agent, or Firm—Harris Zimmerman; Howard Cohen

[57] ABSTRACT

A floor drain includes a cylindrical drain body having external threads formed thereabout and an upper flange extending radially outwardly from the drain body and disposed flush with the floor surface. A threaded nut is secured about the drain body to engage the lower surface of the floor. The drain body includes a lower bore portion adapted to receive the upper end of a waste discharge pipe, the pipe being secured therein by adhesive or the like. A plurality of shoulder stops extend inwardly from the upper end of the lower bore portion to limit the upward position of the waste discharge pipe. The upper end surface of the waste discharge pipe is substantially exposed by the shoulder stops, so that a bead of sealant may be disposed at the junction of the upper end surface and the lower bore to seal the assembly.

4 Claims, 5 Drawing Figures

U.S. Patent  Mar. 15, 1988  4,730,854
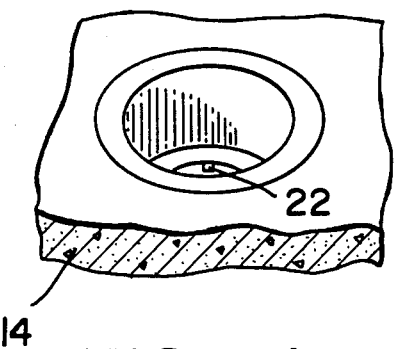
FIG _ 1
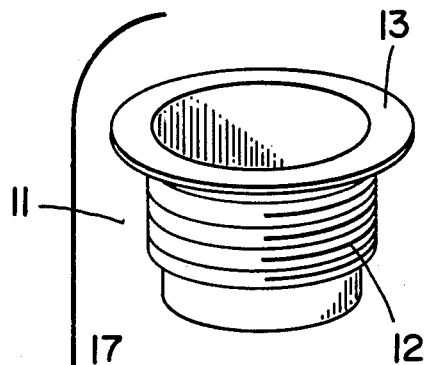
FIG _ 3
FIG _ 2
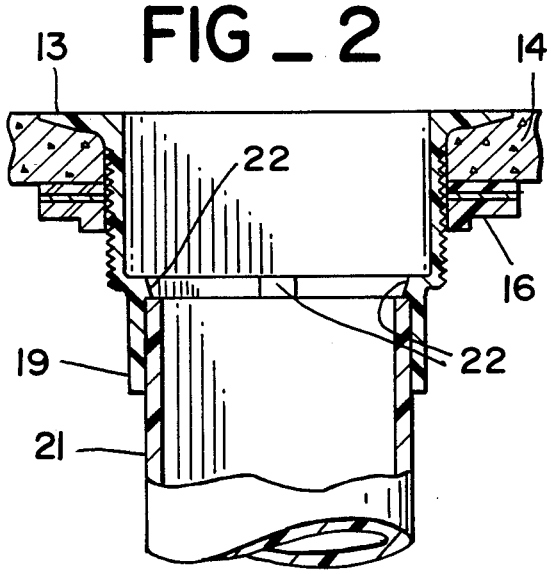
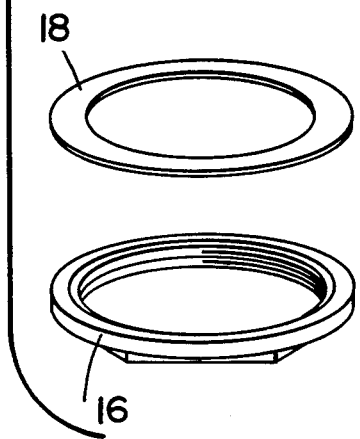
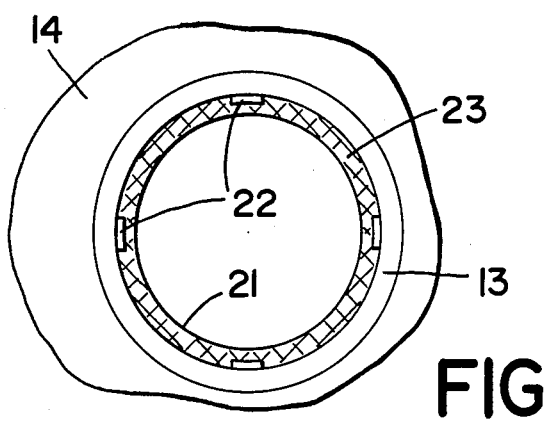
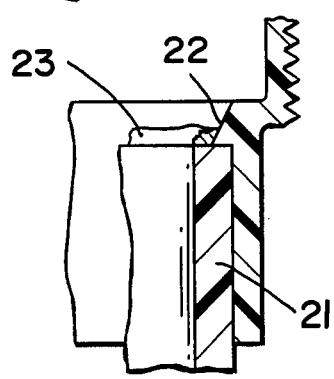
FIG _ 5
FIG _ 4

SEALABLE DRAIN FITTING

BACKGROUND OF THE INVENTION

In the past two decades the plumbing field has been revolutionized by the introduction of plastic pipe, drains, and fittings. The plastic materials are advantageous in their light weight, the ease with which they are worked, and the very simple processes which are required to join the various pipes and fittings together. Due to these qualities, many plumbing jobs have been greatly simplified. However, the use of plastic plumbing materials does have drawbacks. The most serious drawback of plastic materials is that the very method which facilitates simple joining of various plumbing parts also results in a permanent union between those parts. Unlike prior art metal plumbing fixtures, which can be unthreaded or desoldered, plastic fittings, when joined are permanently joined. Thus, although the plastic fittings are far easier to use, any error in their use is far more difficult to rectify.

For example, when a floor drain is being installed and assembled to a waste discharge pipe, it is common practice to install the floor drain mechanically into the drain hole, and to insert the waste discharge pipe in the drain fitting until it abuts an inner stop flange therein. Once the pipe and the drain fitting are joined by the adhesive or solvent, it is virtually impossible to separate them without destroying one or both of the parts. If these parts are joined and subsequently found to be less than perfectly sealed, the leak must be repaired by complete replacement of the drain fitting at the end of the pipe. This requires that the pipe be cut adjacent to the drain fitting, and the drain fitting must be entirely removed and discarded.

SUMMARY OF THE PRESENT INVENTION

The present invention generally comprises a drain fitting which is adapted to receive a secondary seal when it is found that the mechanical union between the fitting and a waste discharge pipe is leaking. The floor drain includes a cylindrical drain body having external threads formed thereabout and an upper flange extending radially outwardly from the drain body and disposed flush with the floor surface. A threaded nut is secured about the drain body to engage the lower surface of the floor. The drain body includes a lower bore portion adapted to receive the upper end of a waste discharge pipe, the pipe being secured therein by adhesive or the like. A plurality of shoulder stops extend inwardly from the upper end of the lower bore portion to limit the upward position of the water discharge pipe. The upper end surface of the waste discharge pipe is substantially exposed by the shoulder stops, so that a bead of sealant may be disposed on the upper end surface of the pipe at its junction with the bore to seal the assembly. Thus the bead of sealant may be employed to create a leakproof union even if the mechanical union formed by the adhesive does leak. As a result, a leaking drain fitting assembly may be repaired, avoiding the costs of scrapping the drain fitting and repeating the installation procedures.

BRIEF DESCRIPTION OF THE DRAWING

FIG. 1 is a perspective view of the drain assembly of the present invention, shown in a typical floor installation.

FIG. 2 is a cross-sectional elevation of the drain assembly of the present invention.

FIG. 3 is an exploded view of the components of the drain assembly of the present invention.

FIG. 4 is a top view of the present invention, shown in a typical installation.

FIG. 5 is an enlarged cross-sectional elevation of the engagement of a waste discharge pipe with a shoulder stop of the present invention.

DESCRIPTION OF THE PREFERRED EMBODIMENT

With reference to the accompanying drawings, the present invention generally comprises a drain assembly, which is adapted to be secured in a floor of a shower or the like. The drain assembly includes a generally cylindrical drain body 11, which is provided with external threads 12 about the upper portion thereof. A flange 13 extends radially outwardly from the upper end of the drain body 11, and is adapted to be disposed flush with the upper surface of the floor 14. A nut 16 is threadedly secured to the upper end of the drain fitting 11 and is provided to compressively urge a gasket and washer 17 and 18 respectively, to impinge upon the lower surface of the floor 14 and form a leak-proof seal therewith.

The drain fitting 11 includes a lower concentric portion 19 which is smaller in diameter than the upper threaded portion. The lower portion 19 of the drain fitting is provided with an inner bore having a diameter slightly larger than the outer diameter of a waste discharge pipe 21. It may be appreciated that the lower portion 19 is adapted to receive the upper end portion of the waste discharge pipe 21 in close fitting fashion. As is known in the prior art, solvent or adhesive may be evenly distributed about the peripery of the upper end portion of the waste discharge pipe, and/or about the inner surface of the portion 19 of the drain fitting. When the upper end of the pipe 21 is then inserted into the lower portion 19 the adhesive quickly effects permanent mechanical bond therebetween.

A salient feature of the present invention comprises a plurality of shoulder stops 22 extending generally radially inwardly from the upper end of the inner bore of the lower portion 19. It may be appreciated that the stops 22 limit the upward extent of the waste discharge pipe 21. In addition, the stops 22 extend inwardly a distance which is less than the thickness of the wall of the pipe 21, as shown clearly in FIG. 5. As a result, the upper end surface of the pipe 21 is substantially exposed and accessible through the upper portion of the drain fitting. The exposed upper end surface of the pipe 21 provides a lateral surface upon which a bead 23 of sealant or adhesive may be placed, the bead 23 contacting the upper end surface of the pipe and the inner wall of the bore of the portion 19 to effect a continuous and leak-proof seal thereabout.

As described in the foregoing, it is customary to join the pipe 21 in the bore of the portion 19 of the drain fitting by means of adhesive or solvent. This mechanical union usually results in a leak-proof seal between the elements 19 and 21. If, however, the mechanical union between the elements 19 and 21 is found to leak, it is not necessary to remove the drain fitting 11 and discard it as has been the practice in the prior art. Rather, the plumber or worker may place the bead 23 of adhesive or sealant about the upper lateral surface of the pipe 21, to seal the pipe to the drain fitting. The small angle subtended by each of the stops 22, together with the fact that the stops extend inwardly less than the thickness of the wall of the pipe 21, assures that the bead 23 will extend continuously about the junction of the elements 19 and 21 to effect a leak-proof seal therebetween. Thus, the present invention, and in particular the shoulder stops 22, alleviate a common problem known in the prior art use of plastic plumbing fittings. Furthermore, the present invention results in a far lower scrap rate in the installation of such plastic fittings.

I claim:

1. A floor drain, including a cylindrical drain body having external threads formed about an upper portion thereof, a flange extending radially outwardly from the upper end of said drain body and disposed flush with the floor surface, a threaded nut secured to said external threads of said drain body to engage the lower surface of the floor, said drain body including a lower bore portion adapted to receive the upper end of a waste discharge pipe, the pipe being secured therein by adhesive or the like, shoulder stop means extending inwardly from the upper end of the lower bore portion to limit the upward position of the waste discharge pipe and to expose the upper end surface of the waste discharge pipe, and sealant bead means disposed at the junction of said end surface and said lower bore portion to seal the assembly of the waste discharge pipe and said lower bore portion, said shoulder stop means including a plurality of shoulder stops extending radially inwardly in said lower bore portion and spaced circumferentially thereabout, said shoulder stops extending inwardly a distance which is less than the thickness of the wall of said waste discharge pipe.

2. The floor drain of claim 1, wherein each of said shoulder stops includes a lower surface extending in a plane generally perpendicular to the axis of said lower bore portion.

3. The floor drain of claim 2, wherein each of said shoulder stops includes an upper surface extending obliquely upwardly and outwardly from the inner terminus of said lower surface to the inner wall of the lower bore portion.

4. The floor drain of claim 1, wherein said sealant bead means includes a self-adhering sealant compound extending in a continuous bead about said junction.

* * * * *